UNITED STATES PATENT OFFICE.

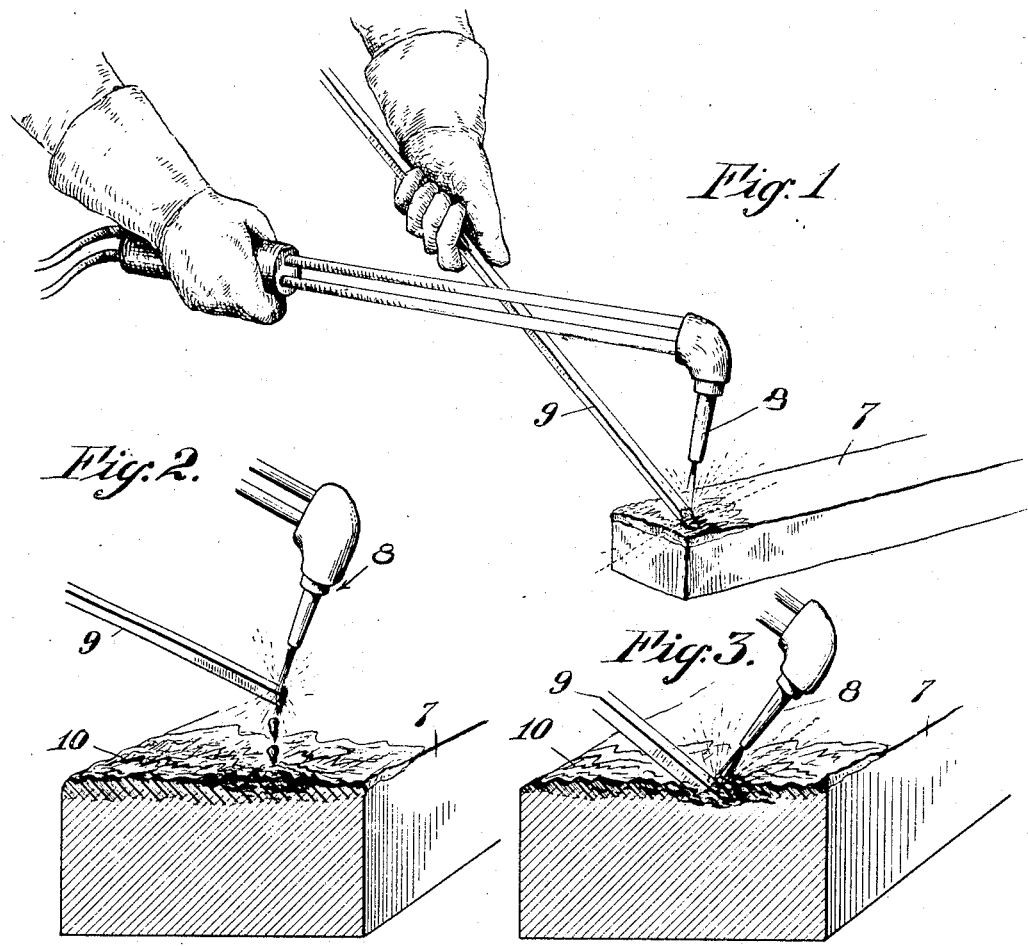

DANIEL P. KELLOGG, ARTHUR P. NEFF, WILLIAM A. ROGERS, AND FRANK COWAN, OF LOS ANGELES, CALIFORNIA.

PROCESS OF WELDING.

1,327,098.　　　　Specification of Letters Patent.　　Patented Jan. 6, 1920.

Application filed October 25, 1915. Serial No. 57,767.

*To all whom it may concern:*

Be it known that we, DANIEL P. KELLOGG, ARTHUR P. NEFF, WILLIAM A. ROGERS, and FRANK COWAN, citizens of the United States, residing at Los Angeles, in the county of Los Angeles and State of California, have invented new and useful Improvements in Processes of Welding, of which the following is a specification.

This invention relates to a process of welding and particularly pertains to a method of forming a body of a hard metal having a high fusion point, on a body of a softer metal having a lower fusion point and which process or method is especially applicable in surfacing a ferrous metal or iron with a ferrous alloy of extreme hardness such as steel. The invention also pertains to the method of forming tools having cutting edges formed of one metal and backed up by another metal and to the method of forming same.

The method heretofore employed in forming a ferrous body having a backing of soft metal and a facing of hard metal consisted in first heating the surface of the harder metal to a welding heat and applying a quantity of melted softer metal thereto to obtain a surface of the softer metal, and then joining a body of the softer metal to the soft metal surface by welding in the ordinary manner. This method is considered objectionable in that it is difficult to obtain a thorough intermingling of hard and soft ferrous metals at their point of juncture and furthermore involves considerable time and skill which renders it expensive.

It is the object of this invention to provide a process in which the harder metal may be applied to the surface of the softer metal and built up thereon to form a thin coating or a body of substantial thickness, as occasion requires, and which can be rapidly effected by persons skilled in oxy-acetylene and similar welding operations, and which insures a thorough intermixture of the different metals at their point of juncture.

Another object is to provide a method of forming tools with working or cutting edges of high speed steel or other extremely hard metal, backed up with a softer tenacious metal, thus producing a tool of high cutting quality combined with strength and thereby providing a tool which is superior to tools formed entirely of high speed or high carbon steel which are brittle and liable to fracture when subjected to heavy strains, and superior to tools formed entirely of softer metal which, while resisting strains, rapidly wear away on their cutting edges.

Other objects will appear hereinafter.

The manner of carrying out the present method or process is illustrated in the accompanying drawings in which;

Figure 1 is a view showing how the harder metal is applied to the softer metal by means of the oxy-acetylene torch, Fig. 2 is a view illustrating a step in the process wherein the harder metal is fused and deposited drop by drop upon a fused surface.

Fig. 3 illustrates another step in the process showing how the fused metals are puddled or agitated and intermingled in building up the body of the harder metal.

Fig. 4 is a detail in section illustrating the softer metal as faced with a body of the harder metal by the present welding process.

Fig. 5 is a detail in section illustrating the metal body as drawn, hammered or rolled to shape to finish the welded surface of the metal.

Fig. 6 is a view illustrating the metal body formed by this process as employed in the construction of a cutting tool.

The present process may be employed wherever it is desired to form a layer of a hard metal such as an alloy steel, containing tungsten, nickel, chromium, manganese, molybdenum, carbon, vanadium, etc., or other alloys or combinations of alloys usually entering into the composition of the commercially known high speed or air hardening steels, upon a body of a softer metal such as wrought iron or low carbon steel. It is more especially adapted for use, however, in coating one or more sides or tipping the cutting edges of various tools, such as lathe and planer tools, punches, taps, drills, reamers, etc., and is here illustrated as employed in the construction of cutting tools.

In carrying out the present process or method, a bar 7, or other body, of the softer metal is heated to a glowing temperature in any desired manner as in a suitable fire or a furnace from whence it is withdrawn and excessive oxids removed from the surface to which the harder metal is to be applied, this surface then being heated in whole or in part to or near its welding heat preferably by means of the flame of an oxy-acetylene burner 8. A narrow bar 9 of the harder metal is then heated in the flame of the torch 8 to a fusing temperature which is considerably higher than the fusing temperature of the bar 7, and the molten harder metal is applied to the heated surface of the softer metal drop by drop, as shown in Fig. 2, and flowed thereon, as illustrated in Fig. 3; the high temperature of the harder metal transmitting its heat to the already highly heated surface of the bar 7 so that complete fusion and union of the two metals takes place, the operation being assisted by the flame of the burner.

The bar 9 is manipulated during the welding operation and is employed in puddling or agitating the fused metal to insure a thorough mixture at the point of juncture of the two metals and to insure the added metal flowing from the bar 9 being built up in a solid wall. The harder metal is maintained at its fused and melting temperature by the flame of the torch and is flowed on to the softer metal in a molten state; the welding temperature being continued until a fused weld or union occurs; the lower strata of the metal cooling and solidifying slowly while the upper strata are being applied. A coating or body 10 of the harder metal may thus be formed on the softer base, as illustrated in Fig. 4, to any desired degree of thickness to form an extremely hard working surface upon a softer non-brittle backing.

It will be seen that the surface or facing of the harder metal is built up in intermingled layers or strata by melting and flowing the harder metal; the built up facing 10 thus being distinguished from jointed surfaces or bodies.

The body or coating 10 of the harder metal will project from the face of the body 7 of the softer metal and will be embedded therein with the particles of the harder metal combined and united with the particles of the softer metal at their point of juncture, as illustrated in Fig. 4, forming an integral mass. The body 7 with its built up surface 10 may then be drawn, rolled, hammered, or otherwise treated while heated and formed into finished shape, as illustrated in Fig. 5. The harder metal 10 may then be shaped and dressed to form a tool, as shown in Fig. 6, having a cutting edge 11; the harder metal forming the cutting edge portion of the tool and the softer metal forming a backing therefor. By this method, high grade tools having extremely hard cutting edges backed up by strong tenacious shanks may be constructed at comparatively small cost. A superior tool is thus produced in that the body portion of the tool which is subjected to great strains may be formed of a metal not liable to fracture by reason of brittleness, as is the case with tools formed entirely of hard metals such as high speed steel, while the cutting edge may be formed of the harder metal. The invention is furthermore of great value inasmuch as a very small quantity of high speed steel is required to form a tool, thus economizing the consumption of this high priced and valuable metal. As old tools formed of high speed steel and the like can be utilized by this process in building up cutting or working edges on softer and cheaper metals, the supply of the former metal may be conserved, and by reason of the small quantity of the expensive high speed steel used in each tool, a tool having the advantages and qualities of high priced tools can be manufactured at small cost.

While the process has been illustrated and described as employing an oxy-acetylene torch, it is manifest that any other suitable means for fusing the harder metal may be used as occasion requires, for example, any other gas flame of sufficiently high temperature and clear of impurities, and any other mechanical step resorted to in flowing the harder metal upon the surface of its backing and that the process may be employed in coating plates or other bodies of metal as occasion may require where it is desired to form a hard outer surface and a soft inner body or back.

In this process, hammering or compression of the adjacent metals is not necessary, but hammering or other means of compression is not objectionable.

If desired, the process may be employed in applying the high speed steel to a metal of comparatively the same hardness such as high carbon steel, as in tipping the cutting edges of high carbon steel tools, as it is found that the high speed steel applied by this process, fuses at a higher temperature than the carbon steel and therefore does not overheat as readily as the latter. A particular advantage derived by constructing the tool with a soft steel or iron body portion and a hard steel tip or cutting edge lies in the fact that a softer metal, by reason of its greater conductivity, will assist in the radiation of the heat generated in the hard metal cutting edge when the tool is in operation.

What we claim is;

1. The process of applying a facing of a hard metal to a body of softer metal, consisting in heating the surface of the softer metal to or near its welding point and fusing the harder metal and applying it drop by drop to the softer metal to build up a body of the harder metal thereon.

2. The process of forming a facing of hard metal upon the surface of a body of softer metal, consisting in heating the surface of the softer metal to or near its welding point, fusing the harder metal, depositing it upon the heated surface of the softer metal and agitating the deposited metal while maintaining it at its point of fusion.

3. The process of forming a coating of high speed steel upon the surface of a softer metal, consisting in heating the surface of the softer metal to or near its fusion point, heating the high speed steel to its fusion point, which is higher than the fusion point of the softer metal, and applying the fused high speed steel drop by drop to the surface of the softer metal and maintaining the high speed steel thus applied at substantially the point of fusion while additional metal is applied to build up a solid body of high speed steel on the softer metal.

4. The method of forming a tool with a cutting edge of high speed steel and a body of softer metal, consisting in heating the surface of the softer metal to or near its point of fusion, heating the high speed steel to its point of fusion, applying the fused steel to the heated surface of the softer metal drop by drop to build up a deposited body of the steel on the softer metal, and thereafter shaping the tool to form the cutting edge thereof in the body of the high speed steel.

5. The process of forming a body of hard metal fusible at a high degree of temperature on a body of softer metal fusing at a lower point of temperature, consisting in heating the surface of the softer metal nearly to its point of fusion, melting the harder metal, depositing it drop by drop on the heated surface of the softer metal, spreading the molten harder metal while adding more of the molten harder metal to build up a solid body of the harder metal on the body of the softer metal.

6. The process of forming a facing of high speed steel on a body of a softer metal, consisting in heating the surface of the softer metal to near its fusion point, fusing the high speed steel in the presence of an oxy-acetylene flame and depositing the fused high speed steel on the heated surface of the softer metal while subjecting the deposited metal and the surface of the softer metal to the action of the oxy-acetylene flame to maintain the same at substantially the point of fusion while additional metal is applied to build up a body of high speed steel on the body of softer metal.

7. The process of forming a body of hard metal fusible at a high degree of temperature on a body of softer metal fusing at a lower point of temperature, consisting in heating the softer metal nearly to a point of fusion apart from the harder metal, melting the harder metal, depositing the harder metal drop by drop on the heated surface of the softer metal so as to increase the temperature thereof to is point of fusion.

8. The method of uniting a facing of high speed tool steel to a body of softer, ferrous metal, which consists in heating the surface of said body to fusion by means of a high temperature gas flame, bringing the high speed steel into said flame while directed against said surface, and melting the high speed steel and applying it little by little to said body to gradually build up a facing of the high speed steel thereon.

9. The method of uniting a facing of high speed tool steel to a body of softer ferrous metal which consists in heating the surface of said body to fusion by means of a high temperature gas flame, bringing the high speed steel into said flame while directed against said surface, and melting the high speed steel and applying it little by little to said body and puddling the added metal with the fused metal of the surface to which it is applied.

In testimony whereof we have signed our names to this specification.

DANIEL P. KELLOGG.
ARTHUR P. NEFF.
WILLIAM A. ROGERS.
FRANK COWAN.